United States Patent
Susag et al.

(10) Patent No.: US 6,223,841 B1
(45) Date of Patent: May 1, 2001

(54) REMOTE FLUID POWER SUPPLY SYSTEM FOR A WORK VEHICLE

(75) Inventors: David E. Susag; Thomas G. Lykken, both of Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/239,625

(22) Filed: Jan. 29, 1999

(51) Int. Cl.⁷ .................................................. B60K 17/28
(52) U.S. Cl. .............................................................. 180/53.4
(58) Field of Search ................................. 180/53.3, 53.8, 180/53.4, 53.6, 53.1; 172/47, 272, 273, 439, 7

(56) References Cited

U.S. PATENT DOCUMENTS

| | | | |
|---|---|---|---|
| 2,351,646 | * | 6/1944 | Vanvleck ............................ 180/53.1 |
| 2,545,236 | * | 3/1951 | Lesniak ............................. 180/53.3 X |
| 3,572,759 | * | 3/1971 | Baugh ................................ 172/439 X |
| 3,630,290 | * | 12/1971 | Williams ................................... 172/7 |
| 3,734,195 | * | 5/1973 | Cantral ..................................... 172/7 |
| 3,871,463 | * | 3/1975 | Geisthoff ........................... 180/53.3 X |
| 4,176,727 | * | 12/1979 | Perin ................................ 180/53.3 X |
| 4,258,765 | * | 3/1981 | Suomi ............................... 180/53.3 X |
| 4,315,700 | * | 2/1982 | Heiligtag et al. ................. 172/439 X |
| 4,483,084 | * | 11/1984 | Caldwell et al. . |
| 4,697,404 | * | 10/1987 | Brockmeier et al. . |
| 4,804,055 | * | 2/1989 | Kostamo ............................. 180/53.3 |
| 4,878,544 | * | 11/1989 | Barnhart . |
| 5,421,416 | | 6/1995 | Orbach et al. . |
| 5,682,954 | | 11/1997 | Burns . |

* cited by examiner

Primary Examiner—Brian L. Johnson
Assistant Examiner—Bryan Fischmann
(74) Attorney, Agent, or Firm—Foley & Lardner

(57) ABSTRACT

A work vehicle having a front end, a rear end, a longitudinal length and a transverse width which includes a remote fluid power supply system, the remote fluid power supply system includes a fluid pump, a fluid reservoir, a first valve fluidly connected to the pump and the reservoir, and a second valve fluidly connected to the pump and the reservoir. The first valve is located on a first side of a transverse center line of a work vehicle at one of the front and rear ends of the work vehicle. The second valve is located on a second opposite side of the transverse center line at said one of the front and rear ends of the work vehicle. In one embodiment, the work vehicle includes a three-point hitch having a pair of transversely spaced side links and an upper hitch link extending from the transverse center line, wherein the first and second valves are located on first and second opposite sides of the upper hitch link. In another embodiment, the work vehicle includes a power take-off shaft extending from the transverse center line, wherein the first and second valves are located on first and second opposite sides of the power take-off shaft at the end of the work vehicle. In at least one of the embodiments, both the first and second valves are fluidly connected to the pump by a single fluid conduit and are fluidly connected to the fluid reservoir by a single fluid conduit extending across the transverse center line of the work vehicle.

24 Claims, 6 Drawing Sheets

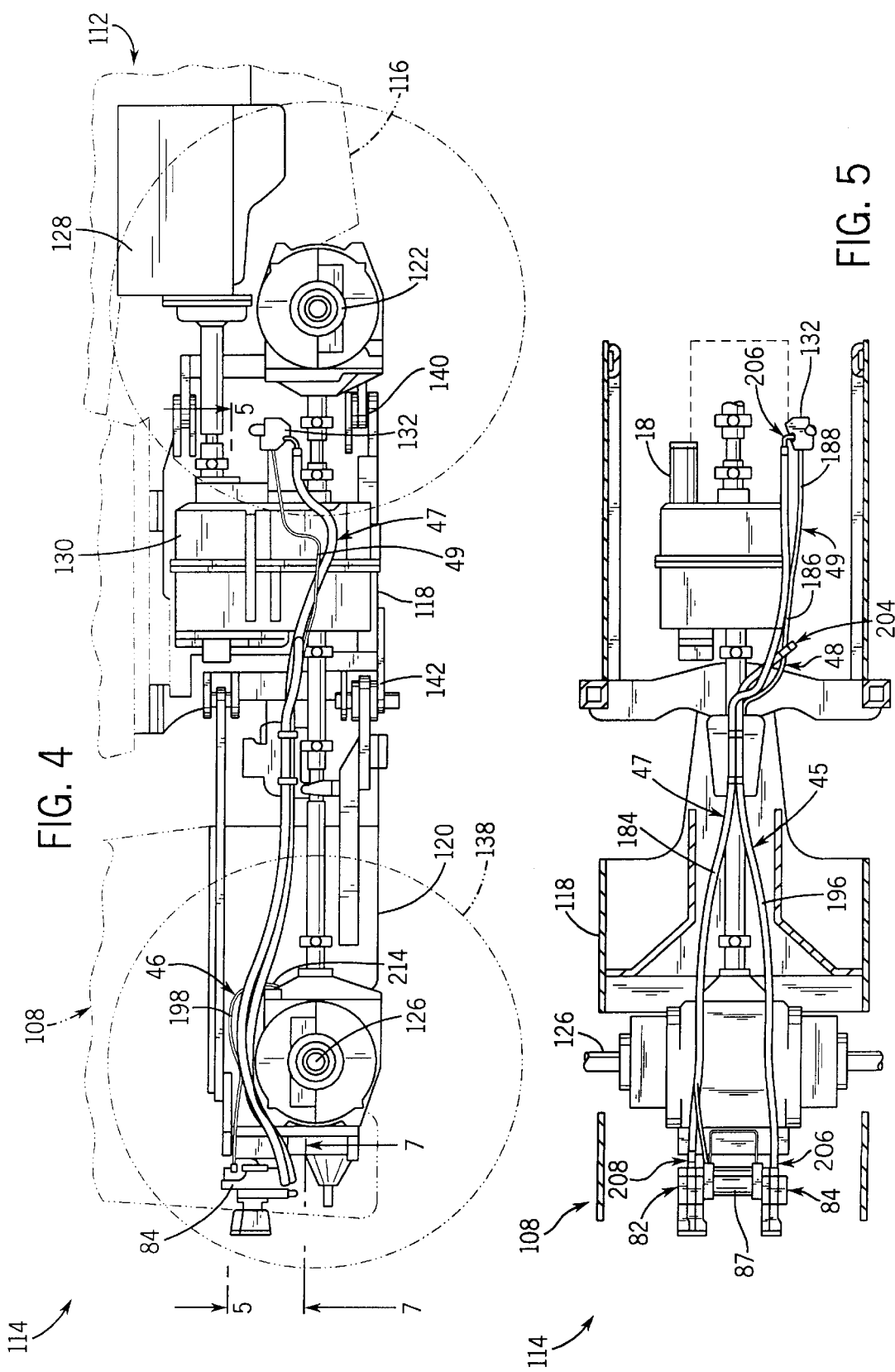

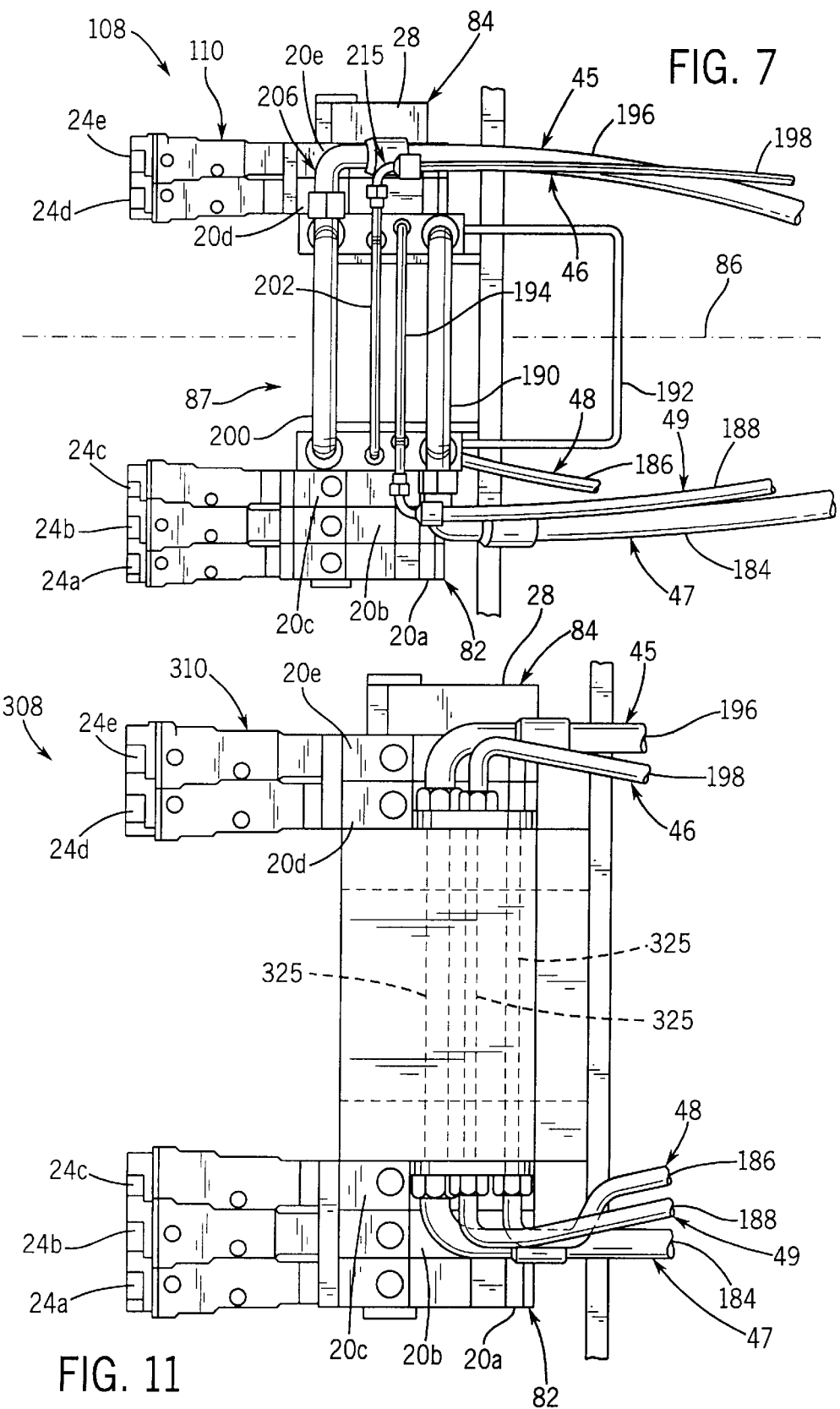

REMOTE FLUID POWER SUPPLY SYSTEM FOR A WORK VEHICLE

FIELD OF THE INVENTION

The present invention relates to a remote fluid power supply system for work vehicles which is utilized to power remote attachments or implements that are pushed or pulled by the work vehicle. In particular, the present invention relates to a remote fluid power supply system which is configured and located such that the system requires a minimum number of fluid conduits extending along the length of the work vehicle and which is conveniently coupled to the implement.

BACKGROUND OF THE INVENTION

Work vehicles, such as construction equipment and agricultural tractors, typically include a remote fluid power supply system for powering tools and implements pushed or pulled by the work vehicle. The remote fluid power supply systems typically include a fluid pump which is driven by the engine of the work vehicle and which pressurizes fluid, such as a hydraulic fluid. The pressurized fluid is delivered through hoses or other conduits wherein the pressurized fluid powers the tool or implement. The supply of pressurized fluid is controlled by a manual or electronic actuation of individual valves located at the front of the work vehicle proximate the vehicle's engine. Although locating the valves at the front of the work vehicle enables the valves to be easily actuated by control cables and linkages from the operator's station or cab, this arrangement requires the hoses connecting the valves to the couplers and the implement to be routed from each valve to the coupler at the rear of the work vehicle. Because each valve requires one hose for supplying pressurized fluid to the coupler and the implement, and one hose for returning fluid from the implement, work vehicles requiring a relatively large number of valves inherently include an even larger number of hoses extending from the valves at the front of the work vehicle to fluid couplers at the rear of the work vehicle. These large number of hoses require valuable space and cause undesirable congestion. This congestion is even more problematic in articulated work vehicles where the hoses must cross the articulated hinge of the work vehicle in close proximity to the work vehicle's drive shaft. If the work vehicle is equipped with a three-point hitch, additional hoses must extend from the valves at the front of the work vehicle to the three-point hitch cylinder assembly at the rear of the vehicle, further congesting the area surrounding the articulated hinge.

Recent work vehicles have attempted to solve this problem by locating the individual fluid valves at the rear of the work vehicle. By doing so, only two hoses extend from the fluid pump and reservoir at the front of the vehicle to the valve at the rear of the vehicle. The first valve provides pressurized fluid from the pump to the valve while a second hose returns pressurized fluid from the valve to the fluid reservoir.

While such work vehicles have substantially reduced the number of hoses extending from the front of the work vehicle to the rear of the work vehicle and across the articulation hinges, such remote fluid power supply systems remain difficult to use and employ. Because the valves are collectively connected to a single hose providing pressurized fluid from the fluid pump and to a single hose for returning fluid to the fluid reservoir, the valves are typically assembled in a single bank. Although easier to assemble and possibly easier to mount to the work vehicle, such banks of multiple valves occupy a large area. At the same time, however, the area at the rear of the work vehicle available for mounting such valves and couplers is extremely limited. Where the work vehicle additionally includes a three-point hitch or a power take-off shaft, the shortage of available mounting space is even greater since the upper hitch link of the three-point hitch also requires additional space for freedom of movement.

Because it is necessary that the upper hitch link of the three-point hitch and the power take-off shaft be generally positioned along the transverse center line of the work vehicle, known work vehicles mount the entire bank of valves to one side of the upper hitch link or the power take-off shaft. Because it is generally desirable to mount the bank of valves in generally the same location at the rear of the work vehicle to simplify manufacturing and to advance user familiarity with the layout components at the rear of the tractor, even work vehicles excluding such options as a three-point hitch or a power take-off mount their auxiliary valves to one side of the transverse center line of the work vehicle.

Although locating the bank of valves to one side of the transverse center line of the work vehicle accommodates such options as the three-point hitch or the power take-off and advances user familiarity, this layout has several drawbacks. Because the bank of valves is located to one side of the transverse center line, longer hoses or extensions are required to connect the implements to couplers extending from the valves. In addition, mounting these longer hoses to the implement is also problematic. For example, in many cases, the longer hoses must be threaded through a three-point hitch, increasing the risk of damage to the hoses.

As a result, there is a continuing need for the work vehicle having a remote fluid power supply system that (1) utilizes existing space at the rear of the work vehicle without interfering with the use of such options as a power take-off or a three-point hitch, (2) may be uniformly and consistently mounted at substantially the same location at the rear of the work vehicle regardless of whether the work vehicle includes such options as a three-point hitch or a power take-off shaft and (3) that it is easy to locate and connect to the implement or tool to be powered.

SUMMARY OF THE INVENTION

The present invention is directed to a work vehicle having a front end, a rear end, a longitudinal length and a transverse width, wherein the work vehicle includes a frame, an engine coupled to the frame, and a remote fluid power supply system. The remote fluid power supply system includes a fluid pump operatively coupled to the engine, a fluid reservoir, a first valve fluidly connected to the pump and the reservoir, and a second valve fluidly connected to the pump and the reservoir. The first valve is located on a first side of the transverse center line of the work vehicle at one of the front and rear ends of the work vehicle. The second valve is located on a second opposite side of the transverse center line of the work vehicle at said one of the front and rear ends of the work vehicle.

According to one aspect of the present invention, the remote fluid power supply system includes a fluid supply conduit connected to the pump and connected to both the first and second valves for pressurizing both the first and second valves. Preferably, the power supply system includes a first hose providing the fluid supply conduit.

According to a second aspect of the present invention, the remote fluid power supply system includes a fluid return conduit connected to the reservoir and connected to both the first and second valves. Preferably, the fluid power supply system includes a first hose which provides the fluid return conduit.

According to yet a third aspect of the present invention, the remote fluid power supply system includes both a fluid supply conduit connected to the pump and connected to the first and second valves for pressurizing both the first and second valves and a fluid return conduit connected to the reservoir and connected to both the first and second valves.

According to yet a fourth aspect of the present invention, the remote fluid power supply system includes a manifold extending between the first and second sides of the transverse center line. The manifold fluidly connects both the first and second valves to at least one of the fluid supply conduits and the fluid return conduit. Preferably, the manifold connects both the first and second valves to both the fluid supply conduit and the fluid return conduit. In the most preferred embodiment, the manifold includes power beyond ports in communication with the first and second manifold conduit for powering external valves.

The present invention is also directed to a remote fluid power supply system for a work vehicle having an end configured for being connected to an implement, the rear including a three-point hitch having transversely spaced side links and an upper hitch link. The remote fluid power supply system includes a fluid pump, a fluid reservoir, a first valve fluidly connected to the pump and the reservoir, and a second valve fluidly connected to the pump and the reservoir. The first valve is located on a first side of the upper hitch link at the end of the work vehicle. The second valve is located on a second opposite side of the upper hitch link at the end of the work vehicle.

The present invention is also directed to a remote fluid power supply system for a work vehicle having an end configured for being connected to an implement, the end including a power take-off shaft. The remote fluid power supply system includes a fluid pump, a fluid reservoir, a first valves fluidly connected to the pump and the reservoir, and a second valve fluidly connected to the pump and the reservoir. The first valve is located on a first side of the power take-off shaft at the end of the work vehicle. The second valve is located on a second opposite side of the power take-off shaft at the end of the work vehicle.

BRIEF DESCRIPTION OF THE DRAWINGS

FIG. 3 is a schematic illustration of a hitch valve of the remote fluid power supply of FIG. 1.

FIG. 4 is a side elevational view of a work vehicle with portions removed to illustrate a first exemplary embodiment of the remote fluid power supply system of FIGS. 1–3.

FIG. 5 is a sectional view of the work vehicle of FIG. 4 taken along lines 5—5.

FIG. 7 is a bottom elevational view of the work vehicle of FIG. 4 taken along lines 7—7.

FIG. 11 is a fragmentary bottom elevational view of the work vehicle of FIG. 9.

DETAILED DESCRIPTION OF THE PREFERRED EMBODIMENTS

Figure 1:
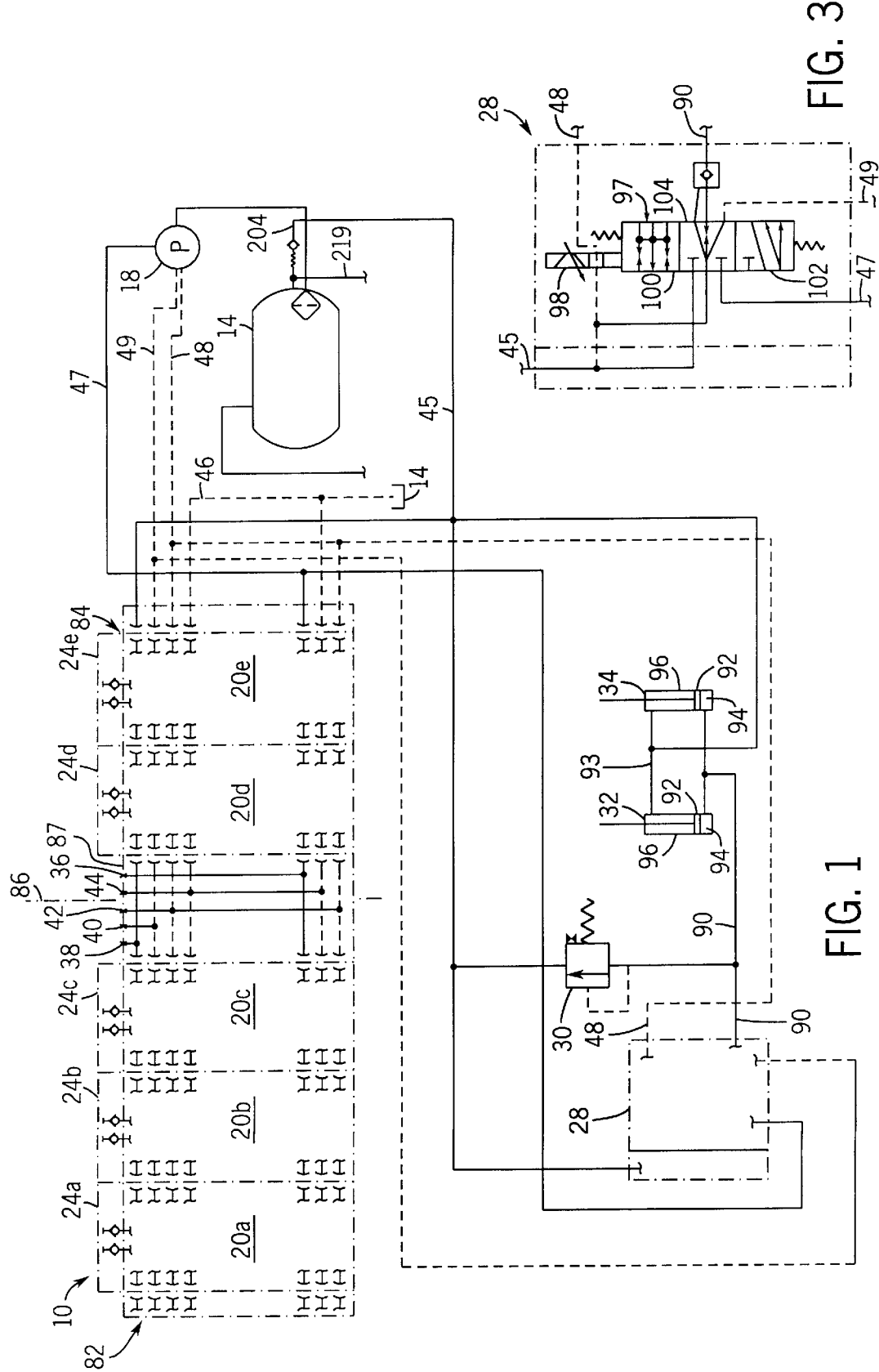
FIG. 1 is a schematic illustration of a remote fluid power supply system for use on a work vehicle.
Figure 2:
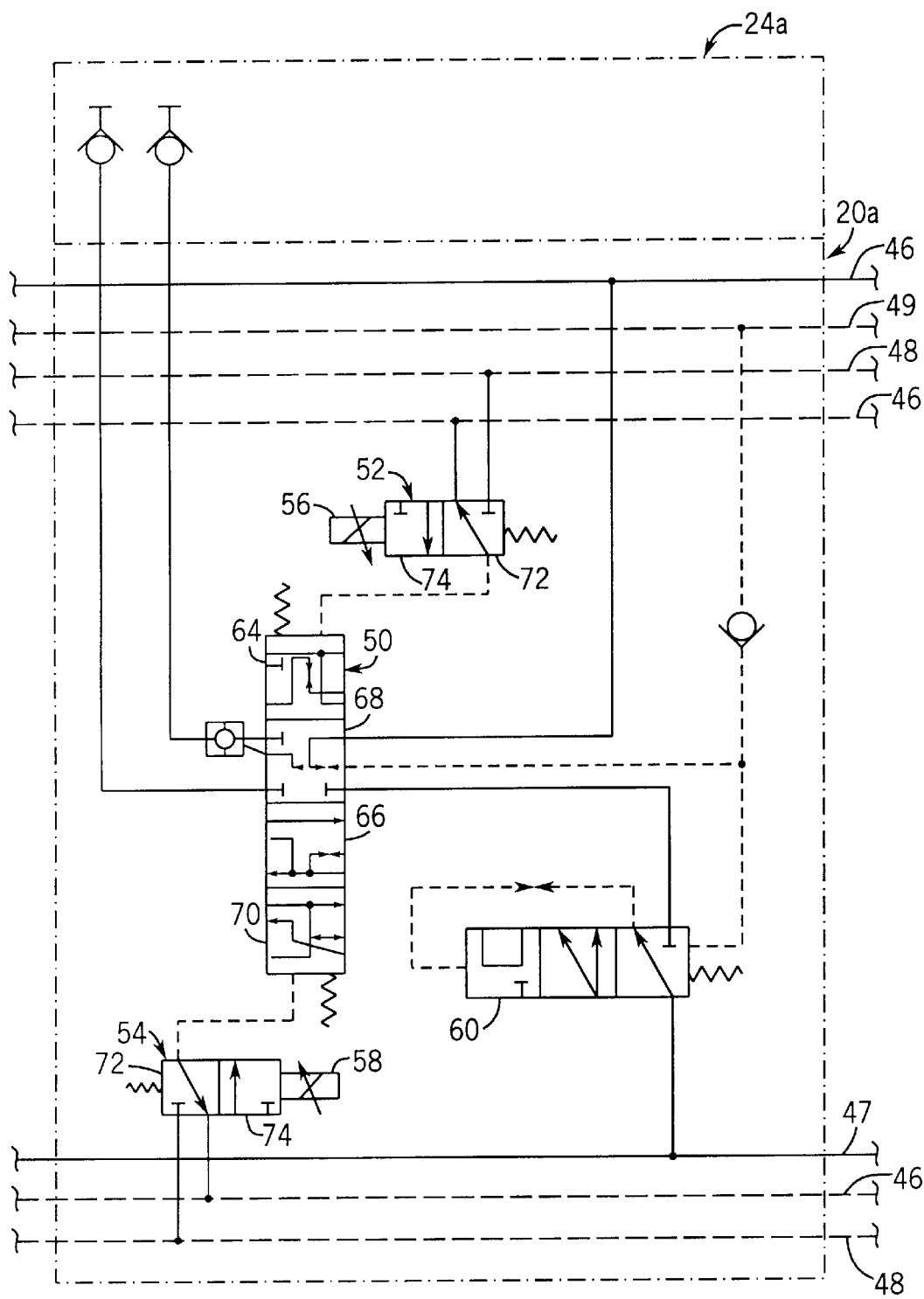
FIG. 2 is a schematic illustration of a valve of the remote fluid power supply of FIG. 1.

FIGS. 1–3 schematically illustrate remote fluid power supply system 10. Remote fluid power supply system 10 is configured to supply remote or auxiliary fluid power on a work vehicle such as an agricultural or construction vehicle. As best shown by FIG. 1, system 10 generally includes fluid sump or reservoir 14, fluid pump 18, auxiliary valves 20a, 20b, 20c, 20d, 20e and couplers 24a, 24b, 24c, 24d and 24e. As further shown by FIG. 1, system 10 is additionally configured to power a three-point hitch and to also provide fluid power to remote valves external to the work vehicle. Accordingly, remote fluid power supply system 10 additionally includes hitch valve 28, relief valve 30, hitch cylinders 32, 34 and power beyond ports 36, 38, 40, 42 and 44. Fluid reservoir 14 and pump 18 are conventionally known components. Fluid reservoir 14 comprises a sump containing a supply of fluid, such as hydraulic fluid. Fluid reservoir 14 is fluidly connected to valves 20a–20e, hitch valve 28, relief valve 30 and hitch cylinders 32, 34 by main return fluid conduit 45 and pilot fluid return conduit 46.

Pump 18 is fluidly connected to reservoir 14 and is configured for being driven by the engine of the work vehicle in which system 10 is employed. Pump 18 is fluidly connected or coupled to valves 20a–20e by main fluid supply conduit 47, pilot fluid supply conduit 48, and sense or signal fluid supply conduit 49. Pump 18 supplies pressurized fluid to valves 20a–20e via main fluid supply conduit 47, pilot fluid supply conduit 48 and sense fluid supply conduit 49. Although pump 18 is illustrated as a single source of pressurized fluid, pump 18 may alternatively be composed of several individual pumps serving as a general source of pressurized fluid.

Main fluid supply conduit 47, pilot fluid supply conduit 48 and sense fluid supply conduit 49 comprise fluid passages extending from pump 18, typically located at a front of the work vehicle near the engine, to a location proximate the rear of the work vehicle where remote fluid power is desired. In some applications, work vehicles are provided with valves at the front of the work vehicle. Accordingly, it is also envisioned that conduits 45, 46, 47, 48 and 49 may extend to the front of the work vehicle.

Preferably, conduits 47, 48 and 49 provide pressurized fluid from pump 18 to each of valves 20a–20e. As a result, the number of fluid conduits extending from the front of the work vehicle to the rear of the work vehicle is reduced to decrease congestion. It is especially advantageous in work vehicles in which the preferred conduits must cross an articulation point of the work vehicle.

Valves 20a–20e selectively and controllably direct pressurized fluid to couplers 24a–24e, respectively. Because valves 20a–20e are substantially identical to one another, FIG. 2 illustrates only a single valve, 20a, in greater detail. As best shown by FIG. 2, valve 20a generally includes valve spool 50, pilot spools 52, 54, pilot solenoids 56, 58, and pressure compensating spool 60. Valve spool 50 is conventionally known and is movable between various states or positions for directing pressurized fluid from main fluid supply conduit 47 and pump 18 to its coupling 24a. In the exemplary embodiment, spool 50 includes a raise position 64, a lower position 66, a neutral position 68 and a float position 70. Spool 50 is actuated between positions 64, 66, 68 and 70 by pilot spools 52, 54 and pilot solenoids 56, 58. Pilot spools 52 and 54 are substantially identical to one another and include a closed position 72 and an opened position 74. Pilot spools 52 and 54 are each fluidly coupled to pump 18 via pilot fluid supply conduit 48. In the opened position, pilot spools 52 and 54 transmit the pressurized fluid from pilot fluid supply conduit 48 to spool 50 to act upon spool 50 so as to move spool 50 between its various positions. In the closed position, pilot spools 52 and 54 interrupt the flow of pressurized fluid from pilot fluid supply conduit 48. Each of pilot spools 52 and 54 is actuated between the opened position 72 and the closed position 74 by pilot solenoids 56 and 58, respectively. Pilot solenoids 56 and 58 are conventionally known electrically actuated solenoids which move pilot spools 52 nd 54 between the opened and closed positions upon receiving appropriate electrical control signals from the work vehicle control system (not shown).

Pressure compensating spool 60 is fluidly connected between main fluid supply conduit 48 and valve spool 50. In addition, pressure compensating spool 60 is also fluidly connected to the signal or sense fluid supply conduit 49. Pressure compensating spool 60 includes three positions and is actuated between the three positions by pressurized fluid through signal or sense fluid supply conduit 49 which acts upon pressure compensating spool 60. Pressure compensating spool 60 isolates excess pressure within main fluid supply conduit 47 from valve spool 50 and compensates for any excess pressure in a conventionally known manner.

In operation, pilot solenoids 56 and 58 actuate pilot spools 52 and 54 between the opened and closed positions in response to receiving appropriate electrical signals from the work vehicle's control system. As a result, pilot spools 52 and 54 tap fluid pressure from pilot fluid supply conduit 48 to shift spool 50 between its various positions. In its opened position, spool 50 taps fluid pressure from main fluid supply conduit 47 to coupling 24a. The amount of pressure being tapped from main fluid supply conduit 47 is regulated by pressure compensating spool 60. Pressure compensating spool 60 shifts between its three positions in response to pressure received through sense fluid supply conduit 49. As a result, pressure compensating spool 60 prevents valve spool 50 from tapping excess fluid pressure from main fluid supply conduit 47. As will be appreciated, valve 20a as well as valves 20b–20e may comprise various other well known valve mechanisms for selectively tapping fluid pressure from a main fluid supply conduit to corresponding fluid couplers. For example, in lieu of comprising electronic valves, valves 20a–20e may comprise manually actuated valves wherein the valve spool is shifted via mechanical links. Moreover, in lieu of being shifted via pilot fluid pressure, valve spool 50 may be shifted by electrical solenoids or other actuation means.

As best shown by FIG. 1, valves 20a, 20b, and 20c are physically and fluidly connected to one another as part of a single bank 82 while valves 20d and 20e are physically and fluidly connected to one another as a separate bank 84. Banks 82 and 84 of valves 20 as well as couplers 24 are located on opposite sides of transverse center line 86 of the work vehicle in which remote fluid power supply system 10 is employed. Banks 82 and 84 are preferably transversely spaced from one another on opposite sides of transverse centerline 86 and are fluidly connected to one another by fluid bridge 87 spanning transverse center line 86. If the work vehicle is equipped with a power take-off shaft at a rear or front of the work vehicle, banks 82 and 84 are mounted on opposite sides of the power takeoff shaft at the rear or front of the work vehicle. If the work vehicle is equipped with a three point hitch having spaced side links and an upper hitch link at the rear or front of the work vehicle, banks 82 and 84 are preferably transversely spaced from one another on opposite sides of the upper hitch link at the rear or front of the work vehicle.

It has been found that this arrangement of banks 82 and 84 of valves 20 and couplers 24 on opposite sides and transverse centerline 86 is extremely advantageous since banks 82 and 84 more easily accommodate such options as the power take-off and the three point hitch. Moreover, this layout or arrangement of banks 82 and 84 enables valves 20 and couplers 24 to be consistently located at the rear of the work vehicle regardless of whether such options as the three point hitch and power take-off are included at the rear of the work vehicle. As a result, the layout of banks 82 and 84 promotes user familiarity with the location of couplers 24. In addition, because banks 82 and 84 are transversely spaced on opposite sides of the transverse center line at the rear of the work vehicle, this layout facilitates the use of shorter hoses or connections to connect the implements to couplers 24 extending from valve 20. Overall, because banks 82 and 84 are transversely spaced on opposite sides of the transverse center line at the rear of the work vehicle, remote fluid power supply system 10 is easier to manufacture, easier to assemble and easier to locate and use.

As noted above, remote fluid power supply system 10 is additionally configured to power a three-point hitch assembly. To this end, remote fluid power supply system 10 includes three-point hitch valve 28, relief valve 30 and hitch cylinders 32 and 34 (shown in FIG. 1). Hitch valve 28 is fluidly connected to pump 18 via main fluid supply conduit 47 and pilot fluid supply conduit 48. Hitch valve 28 selectively taps fluid pressure from main fluid supply conduit 47 to hitch cylinders 32 and 34 via fluid conduit 90. Excess fluid pressure within fluid conduit 90 is relieved by relief valve 30. Relief valve 30 is conventionally known and is fluidly connected between fluid conduit 90 and main fluid return conduit 16. Relief valve 30 relieves excess fluid pressure within fluid conduit 90 by returning a portion of the pressurized fluid within fluid conduit 90 to reservoir 14 via return conduit 45 in a conventionally known manner.

Hitch cylinders 32 and 34 are conventionally known and generally include a piston 92 disposed therein. Each piston 92 has a first side 94 which receives the fluid pressure tapped by valve 28 and transmitted through fluid conduit 90 and a second opposite side 96 which is in fluid communication with main fluid return conduit 45. Upon receiving pressurized fluid from valve 28 through conduit 90, hitch cylinders 32 and 34 raise and lower a three-point hitch (not shown) in a conventionally known manner.

FIG. 3 illustrates three-point hitch valve 28 in greater detail. As best shown by FIG. 3, hitch valve 28 generally includes hitch spool 97 and solenoid 98. Hitch spool 97 includes various states or positions for selectively tapping fluid pressure from main fluid supply conduit 47 to fluid conduit 90 and hitch cylinders 32 and 34. In the exemplary embodiment, spool 97 includes a raise position 100, a lower position 102, and a neutral position 104. Spool 97 is shifted between positions 100, 102 and 104 by solenoid 98. Solenoid 98 comprises a conventionally known electric solenoid coupled to spool 97 for shifting spool 97 between the various positions in response to receiving an appropriate electrical control signal from the control system of the work vehicle. As will be appreciated, hitch spool 97 may be shifted between its various positions by other means such as by use of a solenoid and a pilot spool which is configured to shift spool 97 under pilot pressure. As will further be appreciated, hitch valve 28 may have various other alternatively configured spools or may comprise various other known valve mechanisms for selectively tapping off fluid pressure from a main fluid supply conduit. In the exemplary embodiment, hitch valve 28 and relief valve 30 are physically mounted and fluidly connected adjacent to valve 20e of bank 84. Alternatively, hitch valve 28 and relief valve 30 may be physically mounted and fluidly connected adjacent to any of valves 20a, 20b or 20c of bank 82. In applications where the work vehicle is not provided with a three-point hitch, hitch valve 28, relief valve 30 and hitch cylinders 32 and 34 may be omitted.

Power beyond ports 36, 38, 40, 42 and 44 enable additional valves and couplers to be mounted to fluid power supply system 10 and to be powered by pump 18. Power beyond ports 36, 38, 40, 42 and 44 communicate with main fluid supply conduit 47, pilot fluid supply conduit 48, signal or sense fluid conduit 48, main fluid return conduit 45 and pilot fluid return conduit 46, respectively. Ports 36–4 comprise fluid ports which are temporarily closed. Power beyond ports 36–44 may have valves and couplers directly attached thereto or may be connected to valves and couplers located on an implement by hoses or other conduits extending from the port to the valve on the implement.

In the exemplary embodiment, power beyond ports 36 and 44 are positioned adjacent to bank 84 of valve 20. Power beyond ports 38, 40 and 42 are positioned adjacent to bank 82 of valve 20. As will be appreciated, power beyond ports 36–44 may be relocated or omitted as desired.

FIGS. 4–8 illustrate work vehicle 108 including remote fluid power supply system 110. As best shown by FIGS. 4 and 5, work vehicle 108 has a front end 112 and a rear end 114. In addition to including remote fluid power supply system 110, work vehicle 108 includes front frame 116, intermediate frame 118, rear frame 120, front axle 122, rear axle 126, engine 128, transmission 130, priority valve 132 and three-point hitch 134 (shown in FIG. 6). In the exemplary embodiment, work vehicle 108 is an articulated work vehicle movably supported above the ground by wheels 138 which are driven about the axes of axles 122 and 126. Front frame 116 and intermediate frame 118 articulate relative to one another about joints 140 while intermediate frame 118 and rear frame 120 articulate relative to one another about joints 142. Engine 128 is supported by front frame 116 and drives transmission 130 in a conventionally known manner. Transmission 130 is supported by intermediate frame 118 and provides torque to front axle 122 and rear axle 126 to drive wheels 138. Engine 128 further powers remote fluid power supply system 110. Work vehicle 108 is described in greater detail in copending application Ser. No. 09/160,669, entitled "Articulated Work Vehicle" which was filed on Sep. 25, 1998 (the full disclosure of which is hereby incorporated by reference).

Figure 6:
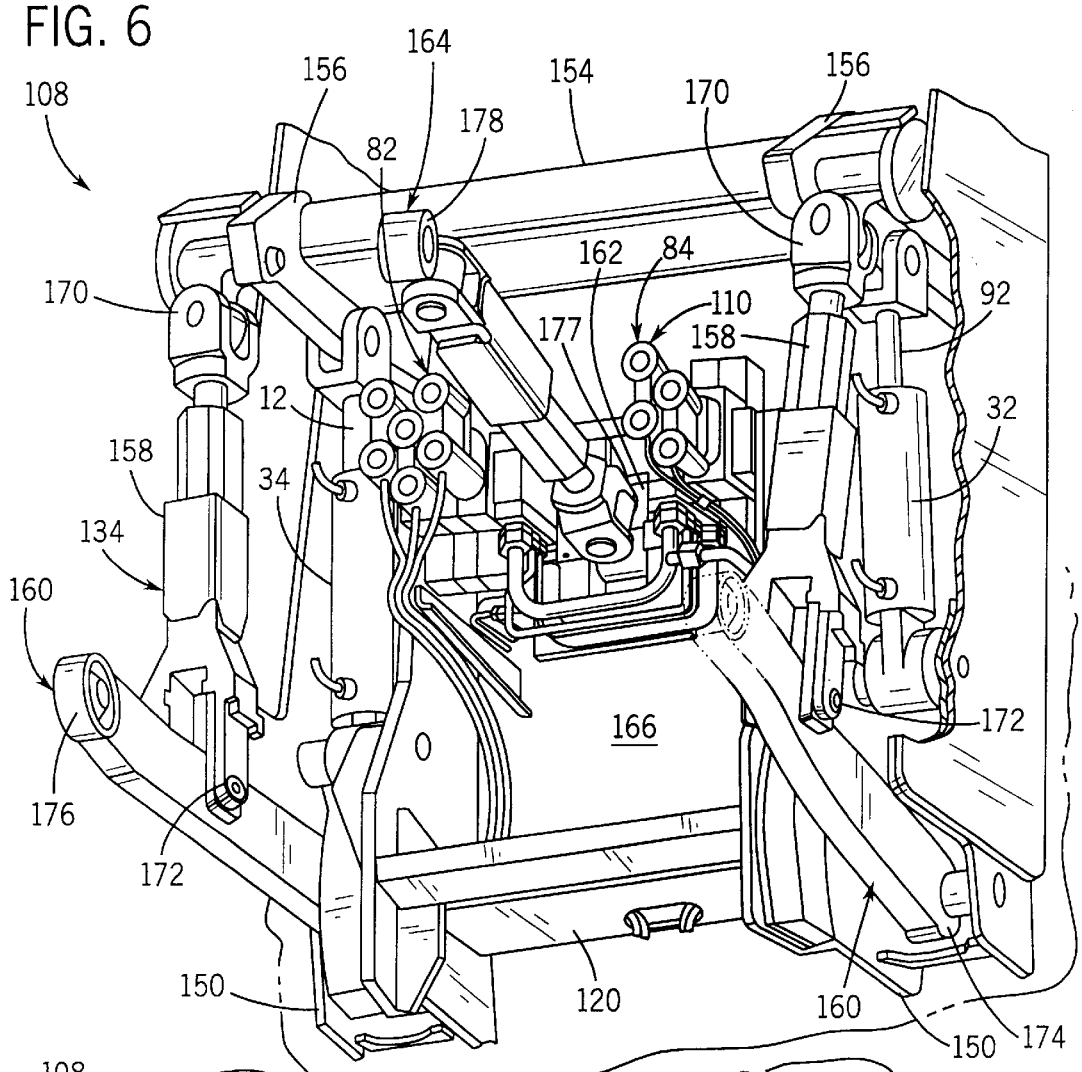
FIG. 6 is a fragmentary perspective view of a rear end of the work vehicle of FIGS. 4 and 5.

FIG. 6 illustrates rear end 114 of work vehicle 108 in greater detail. As best shown by FIG. 6, work vehicle 108 includes a three point hitch 134 such as described in U.S. Pat. No. 5,601,146 entitled "Hitch Assembly For a Tractor" which issued to Case Corporation on Feb. 11, 1997 (the full disclosure of which is hereby incorporated by reference). Hitch 134 generally includes hitch supports 150, rock shaft 154, rocker arms 156, sway bars or lift links 158, side, lower or draft links 160, mounting bracket 162 and center or upper hitch link 164. Hitch supports 150 comprise structural elements which serve as a structural frame to facilitate mounting of the various elements of hitch 134 to rear end 114 of work vehicle 108. Hitch supports 150 mount adjacent to the rear differential housing 166 of work vehicle 108. Alternatively, hitch supports 150 may be mounted to other structural components of rear end 114 of work vehicle 108. As will be appreciated, hitch supports 150 may have various configurations. For example, in lieu of being composed of several individual elements, hitch supports 150 may alternatively comprise a single piece structure such as set forth in U.S. Pat. No. 5,601,146. Moreover, hitch support 150 may be omitted in arrangements where rock shaft 154, draft links 160 and upper hitch link 164 are directly mounted to the rear frame 120 of work vehicle 108.

Rock shaft 154 and rockers arms 156 form a conventionally known rocker assembly. Rock shaft 154 is supported on journal bearings (not shown) provided in a massive support casting secured to differential housing 166. Each of rocker arms 156 is pivotally coupled to hitch cylinders 32, 34 for actuation. Lift links 158 extend between rocker arms 156 and draft links 160. Lift links 158 have a first end 170 pivotally connected to rocker arms 156 in a second opposite end 172 pivotally coupled to draft links 160. Draft links 160 have a first end 174 pivotally coupled to hitch support 150 and a second opposite end 176 adapted for being mounted to an implement. Draft links 160 are pivotally coupled to lift links 158 at a location between ends 174 and 176.

Mounting bracket 162 is secured to rear differential housing 166 of rear frame 120 along the transverse center line 86 of work vehicle 108. Mounting bracket 162 mounts upper hitch link 164 to rear end 114 of work vehicle 108. As will be appreciated, mounting bracket may have various configurations and sizes. Moreover, the mounting bracket may omitted in alternative arrangements where upper hitch link 164 is pivotally mounted directly to rear frame 120 along the transverse center line 86 of work vehicle 108.

Upper hitch link 164 extends from rear end 114 of work vehicle 108 above draft links 160. Upper hitch link 164 has a first end 177 pivotally connected to mounting bracket 162 and a second end 178 adapted for being coupled to the implement being pulled. Upper hitch link 164 cooperates with draft links 160 to maintain a desired orientation of the implement.

In use, ends 176 of draft links 160 and end 178 of upper hitch link 164 are coupled to an implement which is to be pulled. Fluid pressure provided to hitch cylinders 32 and 34 by remote fluid power supply system 110 acts upon pistons 92 which are pivotally connected to rocker arms 156 to pivot rocker arms 156 and rock shaft 154. As a result, draft links 160 which are pivotally connected to rocker arms 156 by lift links 158 are also pivoted and raised to lift the implement. Raising and lowering draft links 160 correspondingly raises and lowers the implement relative to work vehicle 108 and the surface being worked.

Although hitch cylinders 32 and 34 are illustrated as being mounted external to differential housing 166 on opposite sides of upper hitch link 164, work vehicle 10 may alternatively comprise a single hitch cylinder which is provided fluid pressure by remote fluid power supply system 10 and which is located within housing 166 to cooperate with a central bell crank or lever coupled to rock shaft 154.

FIGS. 4–8 illustrate one exemplary embodiment 110 of remote fluid power supply system 10 omitting power beyond ports 36–44. As best shown by FIGS. 4 and 5, pump 18 is preferably connected to a priority valve 132 which is in turn fluidly connected to each of main fluid supply conduit 47, pilot supply conduit 48 and sense fluid supply conduit 49. As best shown by FIGS. 4, 5 and 7, each of main fluid supply conduit 47, pilot supply conduit 48 and sense fluid supply conduit 49 include main portions 184, 186, 188 and connecting portions 190, 192 and 194, respectively. Return conduit 45 and pilot fluid return conduit 46 also include main portions 196, 198 and connecting portions 200, 202, respectively. Main portions 184, 186 and 188 preferably comprise appropriately sized hoses having first ends 206 connected to priority valve 132 and having second ends 208 connected to valve bank 82. The hoses comprising main portions 184, 186 and 188 are bundled together across articulation joints 140 and 142 to be more compact and to reduce interference with the articulation of work vehicle 108. As mentioned above with regard to the schematic illustration of system 10 in FIG. 1, conduits 47, 48 and 49 provide pressurized fluid from pump 18 to valve banks 82 and 84.

As further shown by FIGS. 4–7, main fluid return conduit 45 provides fluid communication between valve banks 82 and 84 and reservoir 14. Main portion 196 of main fluid return conduit 47 extends from valve bank 84 to fluid reservoir 14 located proximate engine 128 of work vehicle 108. Main portion 196 has a first end 204 (shown in FIGS. 1 and 5) connected to reservoir 14 and a second end 206 connected to valve bank 84 and connecting portion 200.

Connecting portion 200 extends between valve banks 82 and 84 to provide fluid communication therebetween. Connecting portion 200 enables pressurized fluid from valve bank 82 to return through main portion 196 which extends adjacent to valve bank 84. Thus, connecting portion 200 enables pressurized fluid to be returned to reservoir 14 from both separately located valve banks 82 and 84 through a single conduit to reduce interference and space requirements.

In the exemplary embodiment, connecting portion 200 comprises a rigid tubular member extending from valve bank 82 to valve bank 84 across transverse center 86 below mounting bracket 162 and upper hitch link 164. Alternatively, connecting portion 200 may comprise a flexible hose or other various fluid passage structures. Moreover, in lieu of extending below mounting bracket 162 and below upper hitch link 164, connecting portion 202 may extend above mounting bracket 162 and upper hitch link 164 or behind mounting bracket 162 and upper hitch link 164 (between mounting bracket 162 and front end 112 of work vehicle 108).

Main portion 198 of pilot return line 46 generally comprises an elongate fluid conduit having a first end 214 fluidly connected to axle 126 and a second end 215 fluidly connected to connecting portion 202 adjacent to valve bank 84. Main portion 198 preferably comprises an elongate hose. Alternatively, main portion 198 may comprise a tubular member or other structure providing a fluid passageway.

Connecting portion 202 comprises a rigid fluid conduit extending between valve banks 82 and 84 and fluidly connected to main portion 198. Connecting portion 202 and main portion 198 enable pressurized fluid from both valve banks 82 and 84 to flow into and about axle 126. This pressurized fluid is further returned to fluid reservoir 14 via a lube return conduit 219 (shown in FIG. 1) communicating between axle 126 and fluid reservoir 14.

Overall, main portions 184, 186, 188 and 196 constitute single fluid passages. Because main portions 184, 186, 188 and 196 are configured to provide pressurized fluid to each of valve 20 from pump 18 or return pressurized fluid from each of valve 20 to reservoir 14 and because main portions 184, 186, 188 and 196 may be easily bundled adjacent to one another across the articulation joint 140 and 142 of work vehicle 108, remote fluid power supply system 110 does not require a large amount of space and does not interfere with the articulation of work vehicle 108. Connecting portions 190, 192, 194, 200 and 202 provide the fluid bridge 87 extending across transverse center line 86 between valve banks 82 and 84. Because connecting portions 190, 192, 194, 200 and 202 connect valve banks 82 and 84, banks 82 and 84 may be transversely spaced from one another while still being fluidly connected to reservoir 14 and pump 18 via a same set of fluid conduits. Moreover, because connecting portions 190, 192, 194, 200 and 202 are configured and located so as to extend across transverse center line 86 at a sufficient distance away from upper hitch link 164, connecting portions 190, 192, 194, 200 and 202 provide full freedom of movement for upper hitch link 164 in the plane containing transverse center line 86.

In the exemplary embodiment, each of connecting portions 190, 192, 194, 200 and 202 are illustrated as extending below mounting bracket 162 and upper hitch link 164. As will be appreciated, each of connecting portions 190, 192, 194, 200 and 202 extending between valve banks 82 and 84 may be positioned in various other orders or arrangements depending upon the location of the terminal ends of main portions 184, 186, 188, 196 and 198. For example, connecting portions 190, 192, 194, 200 and 202 communicating from bank 84 to bank 82 and to main portions 184, 186, 188, 196 and 198, respectively, may be interleaved relative to one another. Moreover, in lieu of extending below mounting bracket 162 and upper hitch link 164, connecting portions 190, 192, 194, 200 and 202 may alternatively extend above mounting bracket 162 and above hitch link 164 across transverse center line 86 or may extend behind mounting bracket 162 and upper hitch link 164 across transverse center line 86 between mounting bracket 162 and the front end 112 of work vehicle 108. As will further be appreciated, some of connecting portions 190, 192, 194, 200 and 202 may extend below upper hitch link 164, some of connecting portions 190, 192, 194, 200 and 202 may extend above upper hitch link 164 and some of connecting portions 190, 192, 194, 200 and 202 may extend behind upper hitch link 164 across transverse center line 86. Furthermore, although connecting portions 190, 192, 194, 200 and 202 are illustrated as separate distinct tubular components connected to main portions 184, 186, 188, 196 and 198, respectively, connecting portions 190, 192, 194, 200 and 202 may alternatively be integrally formed as a single unitary body with main portions 184, 186, 188, 196 and 198, respectively, wherein each conduit is fluidly connected to both valve banks 82 and 84.

Figure 8:
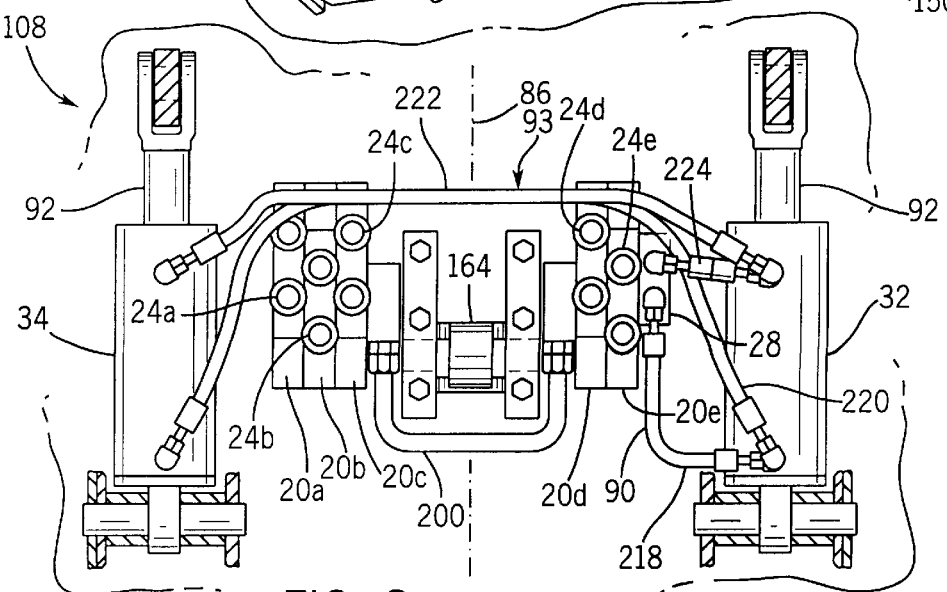
FIG. 8 is a sectional view of the rear end of the work vehicle of FIG. 6.

FIG. 8 illustrates fluid supply system 10 and hitch cylinders 32 and 34 in greater detail. As best shown by FIG. 8, fluid conduit 90 includes a first segment 218 and a second segment 220. Segment 218 extends from valve 28 to hitch cylinder 32 at which point segment 218 is fluidly connected to side 94 of piston 92 (shown in FIG. 1). Segment 220 extends from side 94 of piston 92 across transverse center line 86 to side 94 of piston 92 of hitch cylinder 34. As a result, pressurized fluid from valve 28 is simultaneously supplied to both hitch cylinders 32 and 34.

As further shown by FIG. 8, hitch valve return conduit 93 includes a first segment 222 and a second segment 224. Segment 222 extends from side 96 of piston 92 of hitch cylinder 34 (shown in FIG. 1) to side 96 of piston 92 of hitch cylinder 32. Segment 224 extends from side 96 of piston 92 of hitch cylinder 32 to valve 28 and is in fluid communication with main fluid return conduit 45 extending from valve 28. As a result, pressurized fluid is returned from both hitch cylinders 32 and 34 to reservoir 14 through main fluid return conduit 45. As will be appreciated, conduits 90 and 93 may be omitted where hitch cylinders 32 and 34 as well as valves 28 and 30 are not included with a particular application.

Figure 9:
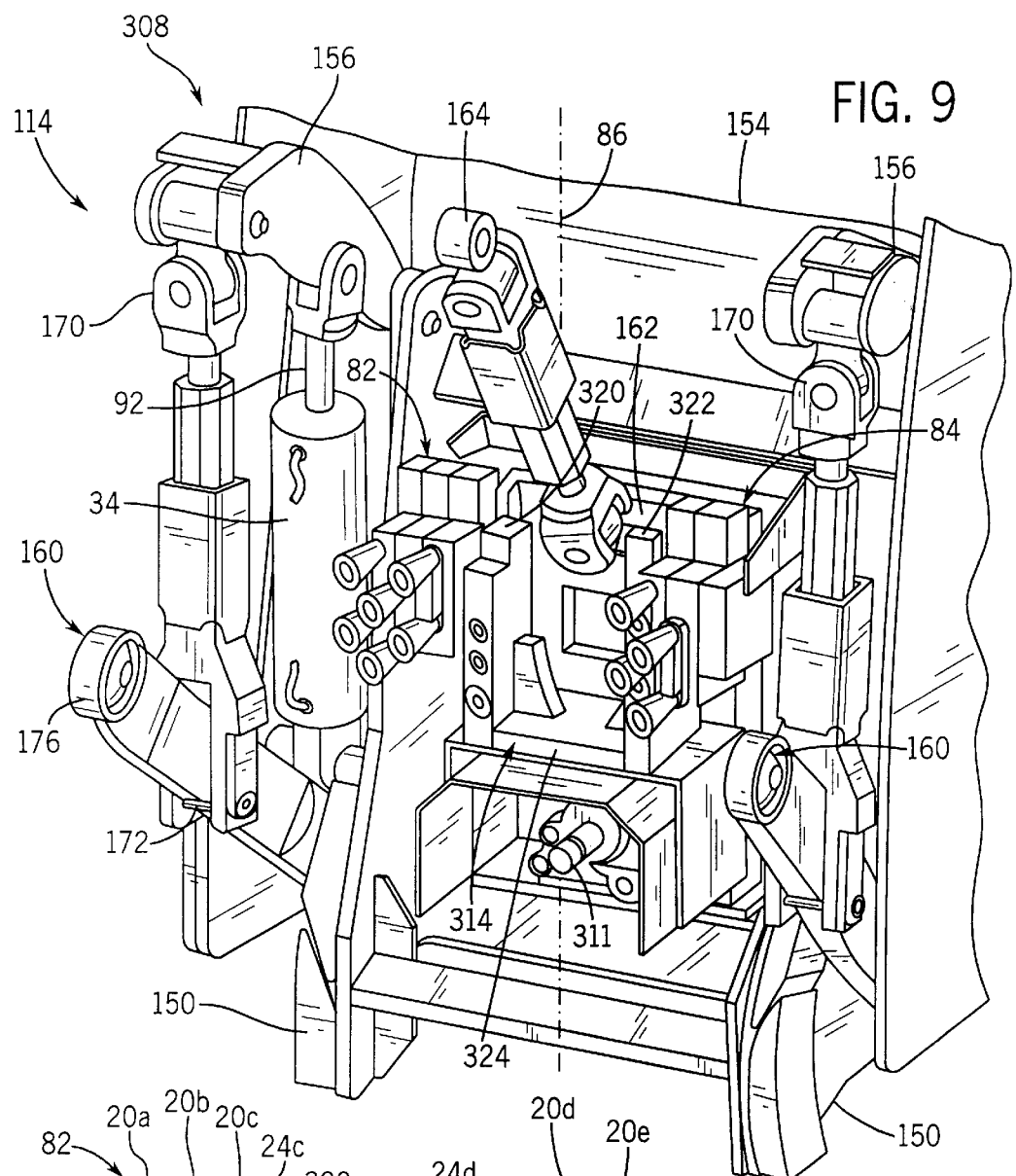
FIG. 9 is a fragmentary perspective view of a rear end of an alternate embodiment of the work vehicle of FIG. 6 including a second exemplary embodiment of the remote fluid power supply system of FIGS. 1–3.
Figure 10:
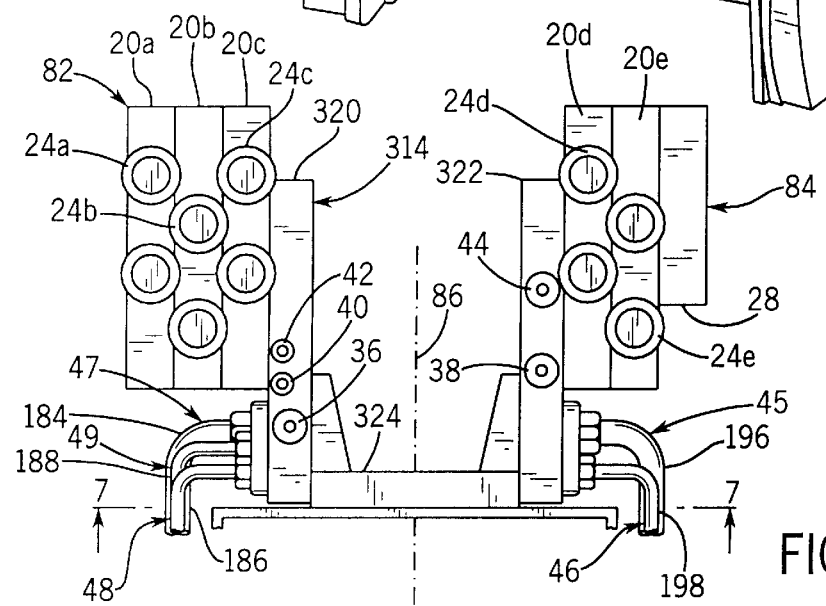
FIG. 10 is an enlarged fragmentary rear elevational view of work vehicle 308 with portions removed for purposes of illustration.

FIGS. 9 and 10 illustrate work vehicle 308, an alternate embodiment of work vehicle 108. FIG. 9 is a fragmentary perspective view of rear end 114 of work vehicle 308. FIG. 10 is a fragmentary bottom plane view of a portion of rear end 114 of work vehicle 308. Work vehicle 308 is similar to work vehicle 108 except that work vehicle 308 includes a power take-off shaft 311 and a second exemplary embodiment 310 of remote fluid power supply system 10 schematically illustrated in FIGS. 1–3. For ease of illustration, those remaining elements of work 308 which are similar to corresponding elements of work vehicle 108 are numbered similarly.

Power take-off shaft 311 is conventionally known and generally comprises a shaft configured for being keyed to a power take-off shaft or bar of an implement. Shaft 311 is rotatably driven by work vehicle 308 in a conventionally known manner to transmit torque to the implement to drive one or more mechanisms of the implement. Power take-off shaft 311 projects from rear 114 of work vehicle 308 along the transverse center line 86 of work vehicle 308. In the exemplary embodiment illustrated, power take-off shaft 311 extends below mounting bracket 162 and upper hitch link 164 between draft links 160. In the alternative work vehicle, power take-off shaft may be provided while the three-point hitch is omitted.

Remote fluid power supply system 310 is similar to remote fluid power system 110 except that remote fluid power supply system 310 includes manifold 314 serving as fluid bridge 87 in lieu of connecting portions 190, 192, 194, 200 and 202. Remote fluid power supply system 310 additionally includes power beyond ports 36, 38, 40, 42 and 44 (shown in FIGS. 1 and 10). Manifold 314 comprises a body composed of one or more parts which includes multiple conduits or fluid passages extending across transverse center line 86 of work vehicle 308 between valve banks 82 and 84. In the exemplary embodiment illustrated in FIGS. 9–11, manifold 314 comprises a body cast of a single unitary structure in which fluid passages are formed during the casting or molding process or in which fluid passages are drilled or bored through and within the body forming manifold 314. Such manufacturing processes for forming manifold 314 are well known to those skilled in the art. Alternatively, manifold 314 may be composed of several parts having fluid passages formed therein, wherein the parts are held adjacent one another or fixed adjacent to one another such that the fluid passages communicate with one another between the parts. Preferably, such an alternative embodiment would include seals about the fluid passages at the junctions of the parts.

As best shown by FIGS. 9–11, manifold 314 is preferably configured so as to extend from valve bank 82 to valve bank 84 across transverse center line 86 and below mounting bracket 162 and upper hitch link 164. Manifold 314 serves as fluid bridge 87 and is configured so as to provide fluid communication between valve banks 82 and 84 for each of conduits 45, 46, 47, 48 and 49 while still enabling sufficient freedom of movement for upper hitch link 164 between valve banks 82 and 84. In the exemplary embodiment, manifold 314 has a generally U-shape including legs 320, 322 and base 324. Legs 320 and 322 of manifold 314 extend upward from base 324 adjacent to and between valve banks 82 and 84. Leg 320 includes side ports (not shown) appropriately communicating with valve bank 82 while leg 322 includes side ports appropriately communicating with valve bank 84 as schematically illustrated in FIG. 1. Leg 320 additionally includes power beyond ports 36, 40 and 42 while leg 322 includes power beyond ports 38 and 44. Base 324 extends from leg 322 to leg 322 across transverse center line 86. Base 324 extends below upper hitch link 164 but above take-off shaft 311. Base 324 includes internal fluid passages or conduits communicating with the internal fluid passages or conduits formed in legs 320 and 322. As best shown by FIG. 11, legs 320, 322 and base 324 of manifold 314 include internally formed fluid passages or conduits 325 communicating between valve banks 82 and 84 across transverse center line 86 of work vehicle 308. Conduits 325 preferably correspond to the fluid passages provided by connecting portions 190, 192, 194, 200 and 202 illustrated in FIG. 7. As will be appreciated, the arrangement of the conduits formed within manifold 314 may vary depending upon the locations at which main portions 184, 186, 188, 196 and 198 terminate adjacent to valve banks 82 and 84.

Manifold 314, with its internally formed fluid passages, enables valve banks 82 and 84 to be sufficiently spaced on opposite sides of transverse center line to accommodate the movement of upper hitch link 164 to connecting portions 190, 192, 194, 200 and 202. However, in addition, manifold 314 is sturdier, less expensive and more easily assembled as compared to connecting portions 190, 192, 194, 200 and 202. Furthermore, manifold 314 provides a supporting structure for providing power beyond ports 36, 38, 40, 42 and 44.

Although shown as extending between upper hitch link 164 and power take-off shaft 311, manifold 314 may have various other shapes and configurations. For example, manifold 314 may alternatively be configured so as to extend above upper hitch link 164 or behind three-point hitch link between mounting bracket 162 and front end 112 of work vehicle 308.

Overall, remote fluid power supply system 10, exemplified in the preferred embodiments 110 and 310, utilizes existing space at the rear of the work vehicle without interfering with the use of such options as a power take-off or a three-point hitch. As a result, remote fluid power supply systems 10, 110 and 310 are uniformly and consistently mounted at substantially the same locations at the rear of the work vehicle regardless of whether the work vehicle includes such options as a three-point hitch or a power take-off shaft. Consequently, the couplers as well as the valves are easy to locate and connect to the implement or tool to be powered.

Although remote fluid power supply systems 10, 110 and 310 have been described for use with a work vehicle having couplers at the rear end of the work vehicle, systems 10, 110 and 310 may alternatively be reconfigured for use on work vehicles having couplers at the front end of the work vehicle such as those work vehicles which include front mounted three-point hitches.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims

What is claimed is:

1. A work vehicle having an end configured for being connected to an implement, the work vehicle comprising:
   at least one frame;
   an engine connected to the at least one frame;
   a three-point hitch extending from the end and having transversely spaced side links and an upper hitch link;
   a fluid pump operatively connected to the engine;
   a fluid reservoir coupled to the at least one frame;
   a first plurality of valves fluidly connected to the pump and the reservoir on a first side of the upper hitch link at the end of the work vehicle, wherein each of the first plurality of valves includes a spool moveable between a plurality of positions;
   a first plurality of couplers fluidly connected to the first plurality of valves, respectively, wherein the first plurality of valves direct pressurized fluid to the first plurality of couplers;
   a second plurality of valves fluidly connected to the pump and the reservoir on a second opposite side of the upper hitch link at the end of the work vehicle, wherein each of the second plurality of valves includes a spool moveable between a plurality of positions; and
   a second plurality of couplers fluidly connected to the second plurality of valves, respectively, wherein the second plurality of valves direct pressurized fluid to the second plurality of couplers.

2. The work vehicle of claim 1, including:
   a fluid supply conduit connected to the pump and connected to both the first and second plurality of valves for pressurizing both the first and second plurality of valves.

3. The work vehicle of claim 2, including:
   a first hose providing the fluid supply conduit.

4. The work vehicle of claim 1, including:
   a fluid return conduit connected to the reservoir and connected to both the first and second plurality of valves.

5. The work vehicle of claim 4, including:
   a first hose providing the fluid supply conduit.

6. The work vehicle of claim 1, including:
   a fluid supply conduit connected to the pump and connected to both the first and second plurality of valves for pressurizing both the first and second plurality of valves; and
   a fluid return conduit connected to the reservoir and connected to both the first and second plurality of valves.

7. The work vehicle of claim 1, including:
   a manifold extending between the first and second sides of the upper hitch link, the manifold having first and second manifold conduits fluidly connecting both the first and second plurality of valves to at least one of the fluid supply conduit and the fluid return conduit.

8. The work vehicle of claim 7, wherein the manifold connects both the first and second plurality of valves to both the fluid supply conduit and the fluid return conduit.

9. The work vehicle of claim 8, wherein the manifold includes power beyond ports in communication with the first and second manifold conduits for powering external valves.

10. The work vehicle of claim 1, wherein the first plurality of valves, the second plurality of valves and the upper hitch link are substantially horizontally aligned with one another.

11. The work vehicle of claim 1, including at least one fluid cylinder-piston device coupled to a three-point hitch, wherein the first plurality of valves is fluidly connected to the fluid power cylinder-piston device.

12. The of claim 1, wherein the end of the work vehicle comprises a rear of the work vehicle.

13. The work vehicle of claim 1, wherein the first plurality of valves and the second plurality of valves each include a spool actuatable between a plurality of positions.

14. The work vehicle of claim 1, wherein the at least one frame includes a front frame, an intermediate frame and a rear frame, wherein the front frame and the intermediate frame articulate relative to one another and wherein the intermediate frame and the rear frame articulate relative to one another.

15. A work vehicle having an end configured for being connected to an implement, the work vehicle comprising:
   a power take-off shaft;
   at least one frame, wherein the at least one frame includes a front frame, an intermediate frame and a rear frame, wherein the front frame and the intermediate frame articulate relative to one another and wherein the intermediate frame and the rear frame articulate relative to one another;
   a fluid pump coupled to the at least one frame;
   a fluid reservoir coupled to the at least one frame;
   a first valve fluidly connected to the pump and the reservoir, the first valve being located on a first side of the power take-off shaft at the end of the work vehicle;
   a first coupler fluidly coupled to the first valve, wherein the first valve directs pressurized fluid to the first coupler;
   a second valve fluidly connected to the pump and the reservoir on a second opposite side of the power take-off shaft at the end of the work vehicle; and
   a second coupler fluidly coupled to the second valve, wherein the second valve directs pressurized fluid to the second coupler.

16. The work vehicle of claim 15, wherein the first valve and the second valve each include a spool actuatable between a plurality of positions.

17. A work vehicle having a front end, a rear end, a longitudinal length and a transverse width, the work vehicle comprising:
   at least one frame, wherein the at least one frame includes a front frame, an intermediate frame and a rear frame, wherein the front frame and the intermediate frame articulate relative to one another and wherein the intermediate frame and the rear frame articulate relative to one another;
   an engine connected to the at least one frame;
   a fluid pump operatively connected to the engine;
   a fluid reservoir coupled to the at least one frame;
   a first valve fluidly connected to the pump and the reservoir, the first valve being located in a first side of a transverse center line at one of the front and rear ends of the work vehicle;
   a first coupler fluidly connected to the first valve, wherein the first valve directs pressurized fluid to the first coupler;
   a second valve fluidly coupled to the pump and the reservoir, the second valve being located on a second opposite side of the transverse center line at said one of the front and rear ends of the work vehicle; and a second coupler fluidly connected to the second valve, wherein the second valve directs pressurized fluid to the second coupler.

18. A work vehicle having an end configured for being connected to an implement, the work vehicle comprising:
   at least one frame;
   an engine connected to the at least one frame;
   a three-point hitch extending from the end and having transversely spaced side links and an upper hitch link;
   a fluid pump operatively connected to the engine;
   a fluid reservoir coupled to the at least one frame;
   a first valve fluidly connected to the pump and the reservoir, the first valve being located on a first side of the upper hitch link at the end of the work vehicle;
   a second valve fluidly connected to the pump and the reservoir, the second valve being located on a second opposite side of the upper hitch link at the end of the work vehicle; and
   a manifold extending between the first and second sides of the upper hitch link, the manifold having first and second manifold conduits fluidly connecting both the first and second valves to at least one of the fluid supply conduit and the fluid return conduit.

19. The work vehicle of claim 18, wherein the first valve, the second valve and the upper hitch link are substantially horizontally aligned with one another.

20. The work vehicle of claim 18 including:
   a first plurality of valves fluidly connected to the pump and the reservoir on a first side of the upper hitch link at the rear of the work vehicle; and
   a second plurality of valves fluidly connected to the pump and the reservoir on a second opposite side of the upper hitch link at the rear of the work vehicle.

21. A work vehicle having a front end, a rear end, a longitudinal length and a transverse width, the work vehicle comprising:
   a frame;
   an engine connected to the frame;
   a fluid pump operatively connected to the engine;
   a fluid reservoir coupled to the frame;
   a first valve fluidly connected to the pump and the reservoir, the first valve including a spool actuatable between a plurality of positions, the first valve being located in a first side of a transverse center line at one of the front and rear ends of the work vehicle;
   a first coupler fluidly coupled to the first valve, wherein the first valve directs pressurized fluid to the first coupler;
   a second valve fluidly coupled to the pump and the reservoir, the second valve including a spool actuatable between a plurality of positions, the second valve being located on a second opposite side of the transverse center line at said one of the front and rear ends of the work vehicle;
   a second coupler fluidly coupled to the second valve, wherein the second valve directs pressurized fluid to the second coupler; and
   a manifold extending between the first and second sides of the upper hitch link, the manifold having first and second manifold conduits fluidly connecting both the first and second valves to at least one of the fluid supply conduit and the fluid return conduit.

22. The work vehicle of claim 20 including:
   a three-point hitch extending from said one of the front and rear ends of the work vehicle and having transversely spaced side links and an upper hitch link, wherein the first valve is located on a first side of the upper hitch link and wherein the second valve is located on a second opposite side of the upper hitch link.

23. The work vehicle of claim 22 including a power take-off shaft extending from said one of the front and rear ends of the work vehicle, wherein the first valve is located on a first side of the power take-off shaft and wherein the second valve is located on a second opposite side of the power take-off shaft.

24. The work vehicle of claim 21 including a power take-off shaft extending from said one of the front and rear ends of the work vehicle, wherein the first valve is located on a first side of the power take-off shaft and wherein the second valve is located on a second opposite side of the power take-off shaft.

* * * * *